United States Patent
Scharf et al.

(10) Patent No.: US 8,429,780 B2
(45) Date of Patent: Apr. 30, 2013

(54) COUPLING MODULE AS INTERFACE BETWEEN AN AIR PASSENGER BRIDGE AND AN AIRCRAFT

(75) Inventors: Lothar Scharf, Bad Sooden-Allendorf (DE); Detlef Gutkuhn, Espenau (DE)

(73) Assignee: Hübner GmbH, Kassel (DE)

( * ) Notice: Subject to any disclaimer, the term of this patent is extended or adjusted under 35 U.S.C. 154(b) by 388 days.

(21) Appl. No.: 12/833,511

(22) Filed: Jul. 9, 2010

(65) Prior Publication Data
US 2011/0309198 A1 Dec. 22, 2011

(30) Foreign Application Priority Data
Jun. 18, 2010 (EP) .................................. EP10006314

(51) Int. Cl.
*E01D 1/00* (2006.01)
(52) U.S. Cl.
USPC .......................................................... 14/71.5
(58) Field of Classification Search .................. 14/69.5, 14/71.5; 244/137
See application file for complete search history.

(56) References Cited

U.S. PATENT DOCUMENTS

| | | | | |
|---|---|---|---|---|
| 3,588,934 | A | * | 6/1971 | Van Marie ...................... 14/71.5 |
| 4,333,195 | A | | 6/1982 | Lichti |
| 4,553,720 | A | * | 11/1985 | Harder ........................ 244/137.2 |
| 4,559,660 | A | | 12/1985 | Lichti |
| 4,590,634 | A | * | 5/1986 | Williams ......................... 14/71.1 |
| 5,253,381 | A | * | 10/1993 | Rawdon et al. ................ 14/71.5 |
| 5,481,773 | A | * | 1/1996 | Alten ............................. 14/69.5 |
| 2002/0116771 | A1 | | 8/2002 | Coles et al. |

FOREIGN PATENT DOCUMENTS

| DE | 10046010 A1 | 3/2002 |
|---|---|---|
| WO | 0076847 A2 | 12/2000 |

* cited by examiner

*Primary Examiner* — Raymond W Addie
(74) *Attorney, Agent, or Firm* — Gifford, Krass, Sprinkle, Anderson & Citkowski, P.C.

(57) ABSTRACT

A coupling module is an interface between the cabin of an air passenger bridge and an aircraft, wherein the coupling module has a canopy roof and a floor spanned over by the canopy roof, wherein the coupling module is held by the cabin of the air passenger bridge to be pivotable about the center axis.

20 Claims, 3 Drawing Sheets

US 8,429,780 B2

COUPLING MODULE AS INTERFACE BETWEEN AN AIR PASSENGER BRIDGE AND AN AIRCRAFT

CROSS-REFERENCE TO RELATED APPLICATION

This application claims priority of European Patent Application EP 10 006 314.8 filed Jun. 18, 2010.

FIELD OF THE INVENTION

The invention relates to a coupling module as interface between an air passenger bridge and an aircraft, wherein the coupling module has a canopy roof and a floor spanned over by the canopy roof.

BACKGROUND OF THE INVENTION

Air passenger bridges are sufficiently known from the prior art. Air passenger bridges serve for the transfer of persons from the aircraft directly to the airport terminal. Since the airport terminal is frequently higher than the door opening of the aircraft the air passenger bridges, which are held at the front end by an undercarriage, frequently extend at an inclination downwardly in direction towards the door opening of the aircraft. At the lower end of the air passenger bridge the air passenger bridge has a cabin pivotable through up to 90° relative to the longitudinal axis of the air passenger bridge, wherein a coupling module for transition from the cabin to the aircraft is arranged at the front end. It has already been indicated that the air passenger bridge extends so as to run downwardly at an angle from the building to the aircraft. The consequence thereof is that the coupling module, which has a floor spanned over in U-shaped manner by an extensible canopy roof, arranged at the cabin bears by its bumper arranged at the end face of the canopy roof against the outer skin of the aircraft at an inclination to the aircraft.

Equally known are coupling modules with a canopy roof and a floor in which the floor is mounted in the coupling module to be movable about the centre longitudinal axis. The solution of a pivotably movable floor in the coupling module is costly. If the floor were not pivotably movable, then this would be disadvantageous from the following aspects:

In most aircraft the doors open outwardly. If the floor of the coupling module runs at an inclination to the floor of the aircraft, then this means that with respect to the opening of the door, the coupling module has to be placed lower so as to ensure that the door during opening does not collide with the floor of the coupling module. The consequence thereof is that the inclination of the air passenger bridge is further increased overall. This requires, for example, an increased expenditure of force for the pushing of wheelchairs. Moreover, it is disadvantageous that due to the fact that the coupling module has to be placed lower so as to ensure opening of the aircraft door a relatively high step between aircraft on the one hand and floor of the coupling module on the other hand arises. This would promote a risk of tripping of passengers when disembarking from or boarding the aircraft. The tendency to trip would be further increased due to the fact that the passengers step from the horizontal aircraft floor onto the inclined floor of the coupling module.

A number of aircraft have a rain gutter above the door entrance. Due to the inclined air passenger bridge and, correspondingly therewith, due to the inclined position of the coupling module it happens on contact of the bellows with the frontally arranged bumper that the bumper in plan view of the aircraft door bears on the righthand side against the rain gutter and on the lefthand side at the top protrudes above the contour of the aircraft. This is particularly the case with small aircraft having a contour which in the region of the front door drops away directly after the door towards the cockpit. The consequence thereof is that the bumper on the righthand side relatively quickly closes the door opening at which it rests on the rain gutter and on the lefthand side forms an opening through which rain, snow, etc., can enter.

SUMMARY OF THE INVENTION

The object of the invention now consists on the one hand of minimising wear of the bumper and on the other hand of ensuring that the bumper peripherally bears tightly against the outer skin of the aircraft in the region of the door opening of the aircraft.

For fulfillment of the object it is proposed in accordance with the invention that the coupling module is held by the cabin of the air passenger bridge to be pivotable about the centre axis. By "centre axis" there is understood in the following a notional axis in the centre of the coupling module about which the coupling module is pivotably mounted by the cabin of the air passenger bridge. Through the arrangement of means for pivotable articulation of the coupling module to the cabin of the air passenger bridge along an arc it is achieved that the coupling module can be aligned with the upper edge of the bumper always exactly parallel to the aircraft door. This means that the upper edge of the door opening serves as a reference line for alignment of the coupling module. In this regard the floor in the coupling module can be constructed to be fixed, which has a positive effect on costs.

Advantageous features of the invention and further refinements of the invention are evident from the subclaims.

It is thus provided, in particular, that the means for pivotable articulation of the coupling module to the cabin of the air passenger bridge comprise at least one arcuate rail section as well as several rollers, wherein the rollers with the at least one rail section are in mechanically positive connection with the rail section in direction towards the coupling module. By virtue of the arrangement of the rollers at the end, which faces the air passenger bridge, of the coupling module and in correspondence therewith the arrangement of the rail sections at the end wall of the cabin of the air passenger bridge it is achieved that the coupling module is pivotable relative to the cabin about an arc section along the rails arranged on an arc. Due to the mechanically positive connection of the rollers with the at least one rail section in direction towards the coupling module it is achieved that the coupling module is held not only parallel to the end face, but also perpendicularly thereto, thus along the already-mentioned notional centre longitudinal axis. In this connection it is advantageously provided that the rollers at the at least one rail section are mounted at the coupling module to mechanically positively engage the rail section at both sides. With respect to the, in particular, mechanically positive connection between the rollers and the rail section the running surface of the roller is, in accordance with a further feature of the invention, inwardly curved and correspondingly therewith the upper and/or lower side of the at least one rail section has or have an outwardly directed curvature.

Due to the fact that the rollers engage the rail section at both sides and due to the curvature of the rollers and correspondingly therewith of the rails at both sides of the rail, the connection between coupling module on the one hand and cabin on the other hand is effected in mechanically positive manner perpendicularly to the end face of the coupling module or the cabin.

According to a particularly advantageous feature of the invention the coupling module has a frame which is, in particular, box-shaped and which approximately follows the contour of the U-shaped canopy roof, wherein the means for pivotable articulation of the coupling module to the cabin of the air passenger bridge, thus, for example, the afore-mentioned rollers, are arranged at the frame of the coupling module and the rail sections are arranged at the end face of the cabin. In this connection it can similarly be provided that the air passenger bridge has, in correspondence with the frame at the coupling module, an adapter frame as counter-member, wherein at this adapter frame, which in plan view is, in particular, similarly peripherally box-shaped in construction like the frame at the coupling module, the rail sections are mounted at the two limbs and at the web of the box-shaped adapter frame.

The arrangement of the rail sections at the adapter frame is in this connection carried out arcuately so that the coupling module, as was already mentioned in the introduction, is mounted by the air passenger bridge to be pivotable relative to the cabin of the air passenger bridge along an arc. The use of an adapter frame detachably connectible with the cabin has the advantage that through exchange of the adapter frame one and the same coupling module can be mounted at air passenger bridges of different manufacturers at the end face of the cabin of the respective air passenger bridge.

A particularly advantageous embodiment of the connection between the coupling module on the one hand and the cabin of the air passenger bridge on the other hand is distinguished by the fact that fastened to the end of the cabin or of the adapter frame are three rail sections which are arranged along an arcuate section and which are similarly of arcuate form, wherein for this purpose provided at the frame of the coupling module, which is oriented towards the cabin of the air passenger bridge, are corresponding rollers or roller pairs matching the arrangement of the rail sections at the air passenger bridge. In this connection, the middle one of the two rail sections is engaged by the rollers at both sides of the rail section, wherein a mechanically positive articulation of the coupling module to the cabin of the air passenger bridge in a direction perpendicular to the end face of the cabin is thereby already provided. The two other rail sections, which are arranged to extend substantially vertically at the end face of the cabin or the adapter frame and which are disposed opposite one another, are each engaged from the outside by the rollers arranged at the end of the coupling module. In this connection it may be mentioned that basically it is quite sufficient when due to the curved form of the upper and lower sides of the rails of the corresponding matching curvature of the rollers a mechanically positive articulation of the coupling module to the cabin of the air passenger bridge is already possible, but a higher security against lifting-off of the coupling module is achieved at the approximately horizontally extending middle rail section, which is engaged by rollers at both sides, at the end of the air passenger bridge. The invention obviously also embraces a form of embodiment in which the rollers are arranged at the cabin of the air passenger bridge and the rails at the coupling module. Both are equivalent when a frame is arranged at the coupling module and the adapter frame is arranged at the end face at the cabin.

It is evident from the above explanations that the coupling module is arranged at the cabin of the air passenger bridge to be pivotable relative to the cabin about a notional centre axis. This means that the floor of the cabin in the region of the transition to the coupling module is inclined. Thereagainst, the floor in the coupling module extends substantially horizontally. It follows therefrom that a small step arises on both sides of the centre line of the floor, which represents the neutral axis. In order to bridge over the step it is either provided that the floor of the coupling module is designed to be resiliently flexible, wherein it is to be noted with respect thereto that the pivotation of the coupling module relative to the air passenger bridge amounts to only a few degrees, or, however, the floor of the coupling module comprises, in the transition to the floor of the air passenger bridge, transition plates each connected by a hinge with the floor of the coupling module. These transition plates are of triangular construction, wherein the transition plates are formed to taper to a point towards a centre of the floor, thus towards the centre line, i.e. towards the neutral axis of the floor, and accordingly have an approximately triangular appearance in plan view. The step-shaped spacings arising on both sides of the centre line, thus the neutral axis, can be bridged over by such transition plates.

A gap is present between the end face, which faces the air passenger bridge, of the coupling module and the end face of the cabin of the air passenger bridge. The gap has approximately a width of the thickness of the rail sections, which are arranged at the end face of the air passenger bridge, in a given case plus the thickness of the adapter frame. For covering the gap, in accordance with a further feature of the invention a fabric is provided which covers over the gap on the upper side and in the region of the sides. In this regard the fabric is, in particular, formed to be resilient or stretchable. Fastening of the fabric can be effected by means of hook-and-burr strips. The canopy roof of the coupling module, which is constructed in the manner of a bellows, has on its end face facing the aircraft fuselage a frame receiving the bumper. In order to now place the canopy roof against the fuselage of the aircraft after movement of the air passenger bridge up to the aircraft fuselage an extending device such as is known per se from the state of the art is provided for the canopy roof. The extending device in this connection comprises a respective articulated arm arranged on each of the two sides of the canopy roof of the coupling module.

BRIEF DESCRIPTION OF THE DRAWINGS

The invention is explained in more detail by way of example in the following with reference to drawings.

In said drawing.

DETAILED DESCRIPTION OF THE PREFERRED EMBODIMENTS

Figure 1:
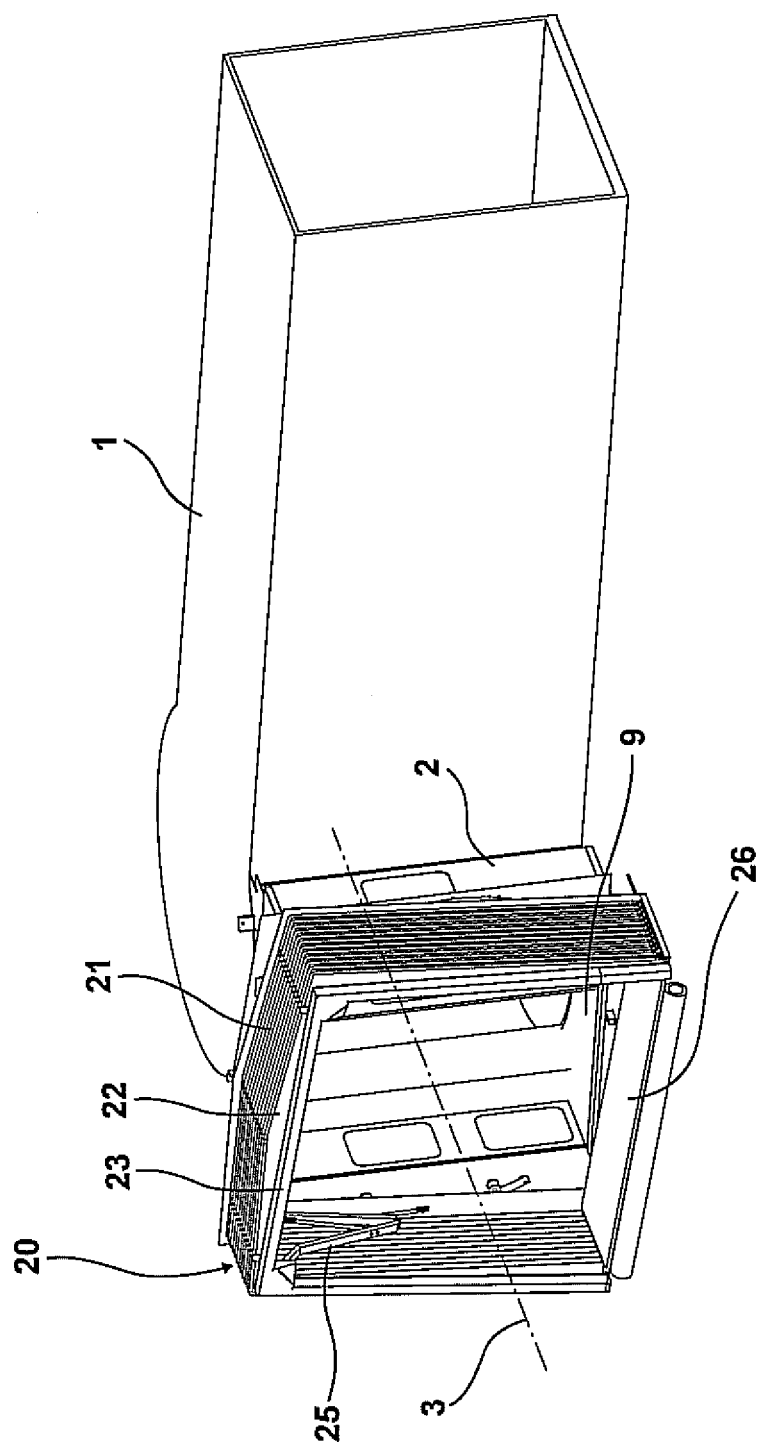
FIG. 1 shows, in perspective illustration, the air passenger bridge with a coupling module articulated at the front end, in the pivoted state of the coupling module relative to the cabin of the air passenger bridge.

The air passenger bridge, which is denoted by 1 and which has at its front end a cabin 2 angled at an angle of 90° relative to the air passenger bridge, the cabin, however, being a component of the air passenger bridge 1, can be seen from the illustration according to FIG. 1. The coupling module denoted generally by 20 is pivotably articulated to the cabin 2 to be pivotable about a notional horizontal axis 3. The coupling module 20 has at its free end face a frame 22 arranged at the canopy roof 21, wherein the bumper denoted by 23 is arranged at the frame. Provided in the interior of the coupling module on each of the two sides is a respective articulated arm 25 serving for the extension movement of the canopy roof 21 of the coupling module 20 so as to ultimately be able to place the bumper 23 against the outer skin of the aircraft fuselage. In addition, the coupling module 20 has the floor 26 onto which passengers step directly after leaving the aircraft.

Figure 2:
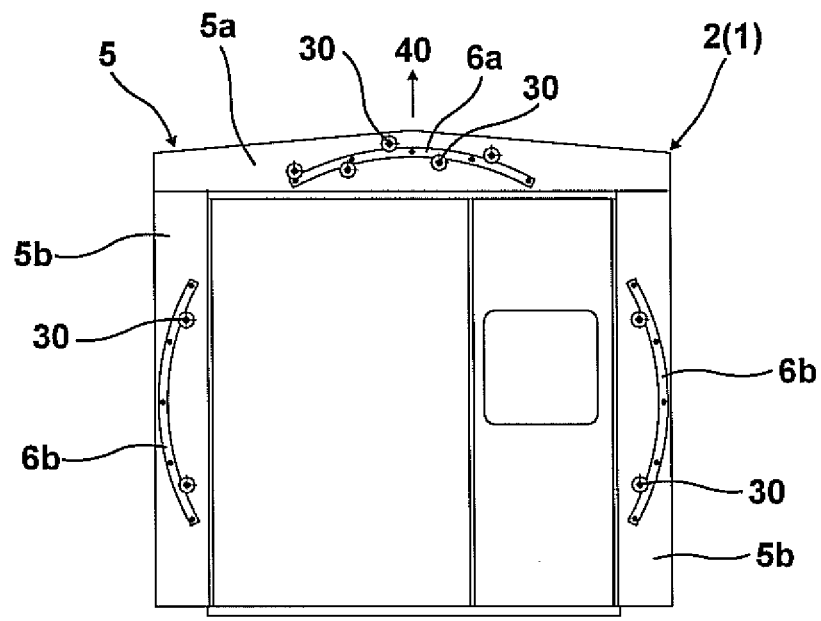
FIG. 2 shows an elevation of the end face of the cabin of the air passenger bridge, wherein the arcuate rail sections can be seen, as well as the rollers which engage the arcuate rail sections, wherein the rollers are arranged at the coupling module.

The subject of the invention is now the pivotable articulation of the coupling module to the cabin 2 of the air passenger bridge 1. To that extent, FIG. 2 shows an elevation of the end face of the cabin 2 of the air passenger bridge 1, wherein the cabin 2 has an adapter frame 5 which can be screw-connected with the end face of the cabin, wherein the adapter frame 5 extends around the floor 9 in box shape and has a web 5a and two limbs 5b. Arcuate rail sections 6a and 6b are fastened not only on the two limbs 5b, but also on the web 5a. The arrangement of the arcuate rail section 6a, 6b is carried out on a section of a circle as can be clearly seen from FIG. 2.

Air passenger bridges of different manufacturers are in use at airports. In the past the case was that a specific coupling module was associated with each air passenger bridge of a manufacturer. An exchangeable adapter frame now opens up the possibility of mounting one and the same coupling module on air passenger bridges of different manufacturers. It is merely necessary to exchange the adapter frame 5. To that extent the adapter frame 5 is capable of differing in its size with respect to the cabin 2, which is to receive it, of the air passenger bridge; however, on the end face facing the coupling module 20 it always has the rail section 6a, 6b in the same arrangement matched to the arrangement of rollers 30 at the frame 29 of the coupling module 20.

Figure 3:
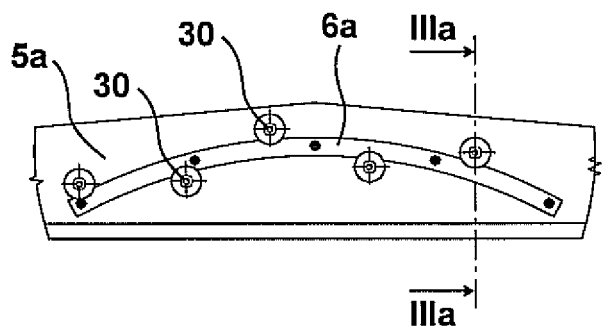
FIG. 3 shows a section of FIG. 2 in enlarged illustration.
Figure 3A:
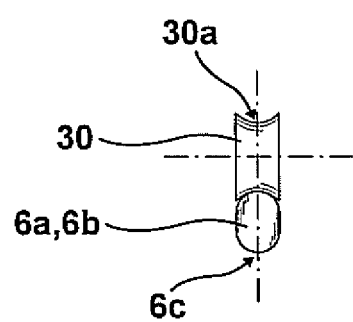
FIG. 3a shows the connection of the rollers with respect to the rail section.
Figure 4:
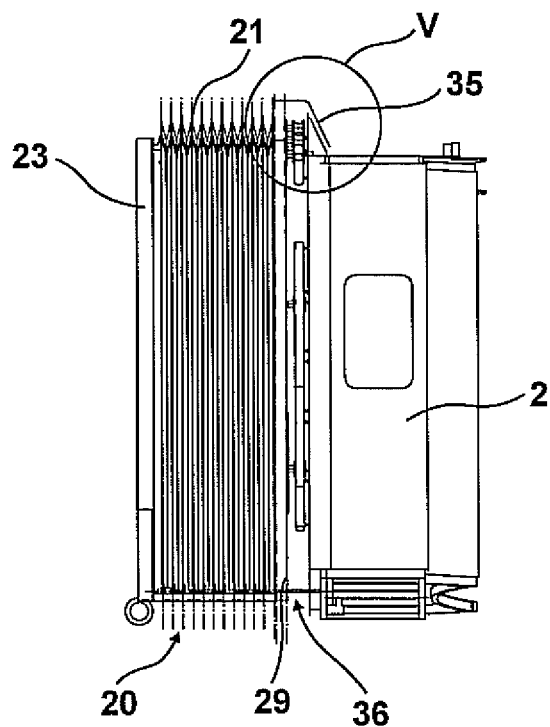
FIG. 4 shows a side view of the transition from the cabin of the air passenger bridge to the coupling module.
Figure 5:
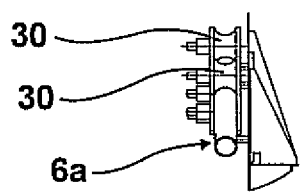
FIG. 5 shows the detail V from FIG. 4 in enlarged illustration.
Figure 6:
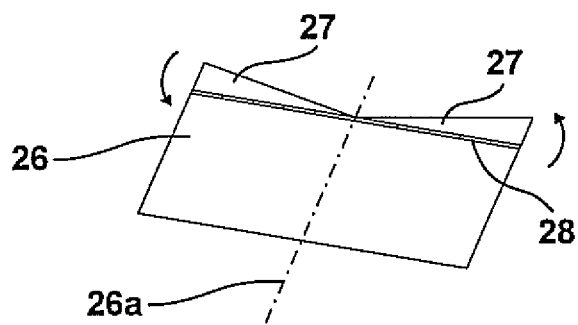
FIG. 6 shows, schematically, the construction of the floor of the coupling module with the transition plates arranged thereat by hinges.

The coupling module 20 has, as is evident from FIG. 4, the frame 29 on its end face facing the cabin 2 of the air passenger bridge, wherein the rollers 30 illustrated in FIG. 2 can be seen at the frame 29. The construction of the rollers 30 on the one hand and the arcuate rail section 6a, 6b on the other hand is evident in detail from the schematic enlarged illustration according to FIG. 3a, wherein it is apparent therefrom that the rollers 30 have an inwardly directed curvature 31 and correspondingly therewith the rail sections 6a, 6b have an outwardly directed curvature 6c. It is evident that the arcuate rail section 6a arranged on the horizontally extending web 5a of the frame 5 of the cabin 2 of the air passenger bridge 1 is engaged by rollers 30 at both sides. The two arcuate rail sections 6b, which are arranged on the limbs 5b of the frame 5 of the cabin 2 of the air passenger bridge, are similarly disposed in connection with rollers 30, wherein, however, the rollers 30 are arranged merely on one side of the arcuate rail section. The rollers 30 arranged on both sides of the rail section 6a prevent, in particular, lifting-off of the coupling module from the air passenger bridge in the direction of the arrow 40, if the construction of the rollers on the one hand and the matching construction of the rail sections 6a, 6b is undertaken with the corresponding curvatures 30a, 6c.

As evident particularly from FIG. 4, a fabric 35 which is, in particular, stretchable is arranged at the bellows 21, wherein the fabric 35 covers the gap 36 between coupling module 20 and cabin 2. The fastening of the fabric which, in particular, is fastened in encircling manner to the coupling module and consequently covers the gap 36 in the region of the limbs 5 and the web 5a is advantageously attached by means of hook-and-burr fasteners not only to the coupling module, but also to the head part 2, without this being shown in more detail.

It is apparent particularly from FIG. 1 that the floor 9 of the cabin 2 of the air passenger bridge extends at an inclination to the floor 26 of the coupling module. The angle between the floor 26 of the coupling module and the floor 9 of the cabin lies approximately between 5 and 6°. Although the angle is relatively small, a step arises between the floor 26 of the coupling module and the floor 9 of the cabin on both sides of the centre line of the floor 26 of the coupling module, wherein in order to bridge over the step a bridging plate 27, which is fastened to the floor 26 of the coupling module by means of a hinge 28, is provided on both sides of the centre line 26a of the floor 26.

The invention claimed is:

1. A coupling module that acts as an interface between a cabin of an air passenger bridge and an aircraft, wherein the coupling module has a canopy roof and a floor spanned over by the canopy roof, characterised in
that the coupling module is pivotably mounted to the cabin of the air passenger bridge such that the coupling module is pivotable about a generally horizontal center axis of the coupling module;
whereby the coupling module is pivoted about its center axis relative to the air passenger bridge so as to position the coupling module floor and roof general level with an aircraft.

2. A coupling module according to claim 1, characterised in that means for pivotable articulation of the coupling module to the cabin along an arc are provided between coupling module and the cabin of the air passenger bridge.

3. A coupling module according to claim 2, characterised in that the coupling module comprises a frame,
wherein the means for pivotable articulation of the coupling module to the cabin of the air passenger bridge are arranged at the frame and at an end face of the cabin.

4. A coupling module according to claim 3, characterised in that the cabin of the air passenger bridge comprises an adapter frame, which is constructed to match the frame of the coupling module, for reception of the means for pivotable articulation of the coupling module to the cabin.

5. A coupling module that acts as an interface between a cabin of an air passenger bridge and an aircraft, wherein the coupling module has a canopy roof and a floor spanned over by the canopy roof, characterised in that the coupling module comprises a frame and is mounted to the cabin of the air passenger bridge to be pivotable about a centre axis;
that means for pivotable articulation of the coupling module to the cabin along an arc are provided between the coupling module and the cabin of the air passenger bridge and are arranged at the frame and at an end face of the cabin; and
that three arcuate rail sections are arranged at the end face of the cabin of the air passenger bridge along an arc, and corresponding rollers are arranged at the frame of the coupling module to match the rail sections.

6. A coupling module according to claim 3, characterised in that the frame of the coupling module has an approximately box-shaped periphery in an end view, wherein the frame has a web and limbs and rollers are mounted at the limbs and the web of the frame.

7. A coupling module according to claim 4, characterised in that an arcuate rail section is arranged at an upper side of the end face of the cabin or of the adapter frame and is engaged by rollers at both sides.

8. A coupling module according to claim 4, characterised in that the arcuate rail sections are arranged laterally at the end face of the cabin or of the adapter frame and are engaged by rollers merely from one side.

9. A coupling module according to claim 1, characterised in that the floor of the coupling module is constructed to be resiliently flexible in the region of the transition to the floor of the cabin.

10. A coupling module according to claim 1, characterised in that the cabin is at an end of the air passenger bridge, and the coupling module is mounted to the cabin such that it is pivotable about the centre longitudinal axis, in a setting able to be angled relative to the air passenger bridge.

11. A coupling module according to claim 1, characterised in that the floor of the coupling module has a transition to a floor of the cabin of the air passenger bridge, and a plurality of transition plates are each connected by a respective hinge with the floor of the coupling module at the transition.

12. A coupling module according to claim 11, characterised in that the transition plates are of triangular construction, wherein the transition plates taper to a point towards the centre of the floor of the coupling module.

13. A coupling module according to claim 1, characterised in that the canopy roof is of U-shaped construction.

14. A coupling module according to claim 4, characterised in that both the frame of the coupling module and the adapter frame of the air passenger bridge have a peripherally box-shaped construction.

15. A coupling module according to claim 1, characterised in that there is a gap between coupling module and the cabin of the air passenger bridge, which is capable of being covered by a fabric.

16. A coupling module according to claim 1, characterised in that the canopy roof of the coupling module is extensible.

17. A coupling module according to claim 1, characterised in that the canopy roof has a bumper at its end face.

18. A coupling module that acts as an interface between a cabin of an air passenger bridge and an aircraft, wherein the coupling module has a canopy roof and a floor spanned over by the canopy roof, characterised in that the coupling module is mounted to the cabin of the air passenger bridge to be pivotable about a centre axis; and that means for pivotable articulation of the coupling module to the cabin comprise at least one arcuate rail section as well as a plurality of rollers;

wherein the rollers are disposed in mechanically positive connection with the at least one rail section in a direction towards the coupling module.

19. A coupling module according to claim 18, characterised in that the rollers engage the at least one rail section at both sides.

20. A coupling module according to claim 18, characterised in that the running surface of the rollers is inwardly curved and corresponding thereto the upper and/or lower side of the at least one rail section has or have an outwardly directed curvature.

* * * * *